United States Patent
Xiao et al.

(10) Patent No.: US 11,556,263 B2
(45) Date of Patent: Jan. 17, 2023

(54) RECONFIGURABLE SSD STORAGE POOL

(71) Applicant: Kioxia Corporation, Tokyo (JP)

(72) Inventors: Edward Xiao, Alameda, CA (US);
Scott Stetzer, Foothill Ranch, CA (US)

(73) Assignee: Kioxia Corporation, Tokyo (JP)

( * ) Notice: Subject to any disclaimer, the term of this patent is extended or adjusted under 35 U.S.C. 154(b) by 98 days.

(21) Appl. No.: 17/232,880

(22) Filed: Apr. 16, 2021

(65) Prior Publication Data
US 2021/0232333 A1    Jul. 29, 2021

Related U.S. Application Data

(63) Continuation of application No. 16/570,455, filed on Sep. 13, 2019, now Pat. No. 11,003,376.

(51) Int. Cl.
*G06F 3/06* (2006.01)
*G06F 11/10* (2006.01)

(52) U.S. Cl.
CPC .......... *G06F 3/0644* (2013.01); *G06F 3/0616* (2013.01); *G06F 3/0679* (2013.01); *G06F 11/1068* (2013.01)

(58) Field of Classification Search
CPC ...... G06F 3/064; G06F 3/0644; G06F 3/0659; G06F 12/0646; G06F 3/0616; G06F 2212/1036; G06F 3/0649
See application file for complete search history.

(56) References Cited

U.S. PATENT DOCUMENTS

| | | | | |
|---|---|---|---|---|
| 10,318,185 B2 * | 6/2019 | Hady | ..................... | G06F 3/0688 |
| 2005/0172064 A1 * | 8/2005 | Krygier | ............... | G06F 12/0646 |
| | | | | 711/2 |
| 2013/0297907 A1 | 11/2013 | Ki et al. | | |
| 2014/0006688 A1 * | 1/2014 | Yu | .......................... | G11C 16/10 |
| | | | | 365/185.03 |
| 2016/0342345 A1 | 11/2016 | Kankani et al. | | |
| 2016/0378337 A1 * | 12/2016 | Horspool | .............. | G06F 3/0616 |
| | | | | 711/103 |
| 2017/0017402 A1 * | 1/2017 | Zheng | .................... | G06F 3/0634 |
| 2017/0192704 A1 * | 7/2017 | Lee | ........................ | G06F 3/0688 |

OTHER PUBLICATIONS

Zhitang Song et al., "From Octahedral Structure Motif to Sub-Nanosecond Phase Transitions in Phase Change Materials for Data Storage", Science China Information Sciences, Aug. 2018, vol. 61, pp. 1-16.

Daniel Bittman et al., "Optimizing Systems for Byet-Addressable NVM by Reducing Bit Flipping," USENIX Association, 17th USENIX Conference on File and Storage Technologies, Feb. 25-28, 2019, pp. 16-30.

International Search Report & Written Opinion dated Dec. 21, 2020 in International Application No. PCT/IB2020/000722.

* cited by examiner

*Primary Examiner* — Charles Rones
*Assistant Examiner* — Hewy H Li
(74) *Attorney, Agent, or Firm* — Allen & Overy LLP

(57) ABSTRACT

A solid state drive (SSD) includes a first storage region classified as byte addressable NV storage region and a controller communicatively coupled to the first storage region by a bus. The controller detects a reduced storage capacity of the first storage region, and in response to the detection, reclassifies the first storage region as a block addressable NV storage region. The SSD dynamically changes byte addressable NV storage regions to block addressable NV storage regions as the byte addressable NV storage regions are degraded, thereby extending the longevity of the SSD.

20 Claims, 6 Drawing Sheets

RECONFIGURABLE SSD STORAGE POOL

CROSS-REFERENCE TO RELATED APPLICATION

This application is a continuation of application Ser. No. 16/570,455 filed Sep. 13, 2019, the entire contents of which are incorporated herein by reference.

FIELD OF THE INVENTION

The present invention generally relates to systems and methods for dynamic reconfiguration of storage protocols of storage regions.

BACKGROUND OF THE INVENTION

Solid state drives (SSDs) used for storage include various non-volatile (NV) storage regions into which data can be stored. Typically, an SSD stores data to addressable NV storage regions implemented using block addressable NV storage memory devices such as NAND flash memory. Increasingly, new byte addressable NV memory technologies such as phase change memory (PCM), magnetic random access memory MRAM) and resistive random access memory (ReRAM) are being used as storage regions within SSDs. Byte addressable NV storage regions can be written to and read from at a single byte or character level and can be over-written directly without being erased first as is common with block addressable NAND flash memory. Block addressable regions can be written to and read from only at blocks of data and are considered to be high endurance, while the endurance of byte addressable NV memory may be of a similar strength, it may be compromised by manufacturing difficulties and user data workload patterns.

When writes are performed on byte addressable NV storage memory, a re-programming operation is performed on a memory cell only when a bit changes from 0 to 1, or vice-versa (known as a 'bit flip'). The memory cells degrade as the number of bit flips performed on individual cells increases and when the number reaches a threshold, a cell may become unusable for storage purposes and errors may result when reading or writing. As the byte addressable NV storage memory on an SSD degrades, storage regions may cease to function and become unavailable and the total storage available to a user decreases. While error correction code (ECC) protection bits in the memory may be used to detect and correct bit errors, byte addressable NV storage memory regions may become non-functional when the number of bits in error in a region exceeds a threshold which is the limit of the error correction capability of the ECC. Since wear leveling of memory cells and logical to physical address translation is not normally performed with byte addressable NV memory due to the increased read and write latencies this would impose, specific user data workload patterns may cause excessive bit flipping in certain memory cells and cause a memory region to become unusable prematurely.

Manufacturing of byte addressable NV storage memory modules may be more difficult than other types of storage modules. At manufacturing, byte addressable NV memory modules may have a high number of faulty memory cells and cannot be sold for use in products because the regions fail manufacturing tests, resulting in lower yields and higher overall NV memory module costs. Even if the errors can be corrected with strong ECC logic, the application of stronger logic in the module increases the cost of manufacture as well as the storage access latency to unacceptable levels.

Accordingly, there is a long-felt need for increased usability of byte addressable NV memory in SSDs by addressing the above-noted problems.

BRIEF DESCRIPTION OF THE INVENTION

In an aspect, an SSD enabled to dynamically change byte addressable NV storage regions to block addressable NV storage regions includes a first storage region classified as a byte addressable NV storage region and a controller communicatively coupled to the first storage region by a bus. The controller detects a reduced storage capacity of the first storage region, and in response to the detection reclassifies the first storage region as a block addressable NV storage region.

In another aspect, a method for extending the life of an SSD including a first storage region and a controller communicatively coupled to the first storage region includes detecting, by the controller, a reduced storage capacity of the first storage region of the SSD, where the first storage region is a byte addressable NV storage region. The method also includes using the controller to reclassify the first storage region as a block addressable NV storage region in response to the detection.

DETAILED DESCRIPTION OF THE INVENTION

SSD usability may be improved by enabling SSDs to dynamically reclassify byte addressable NV storage regions as block addressable NV storage when the byte addressable NV storage has degraded. Reclassifying storage regions which are no longer acceptable for byte addressable NV storage allows the SSD to continue to utilize the regions by making the storage regions available to the user as block addressable NV storage regions. U.S. patent application Ser. No. 16/570,521, titled "Solid State Drive Supporting Both Byte Addressable Protocol and Block Addressable Protocol," filed Sep. 13, 2019 and concerning block and byte addressable protocols is incorporated by reference herein in its entirety.

Figure 1:
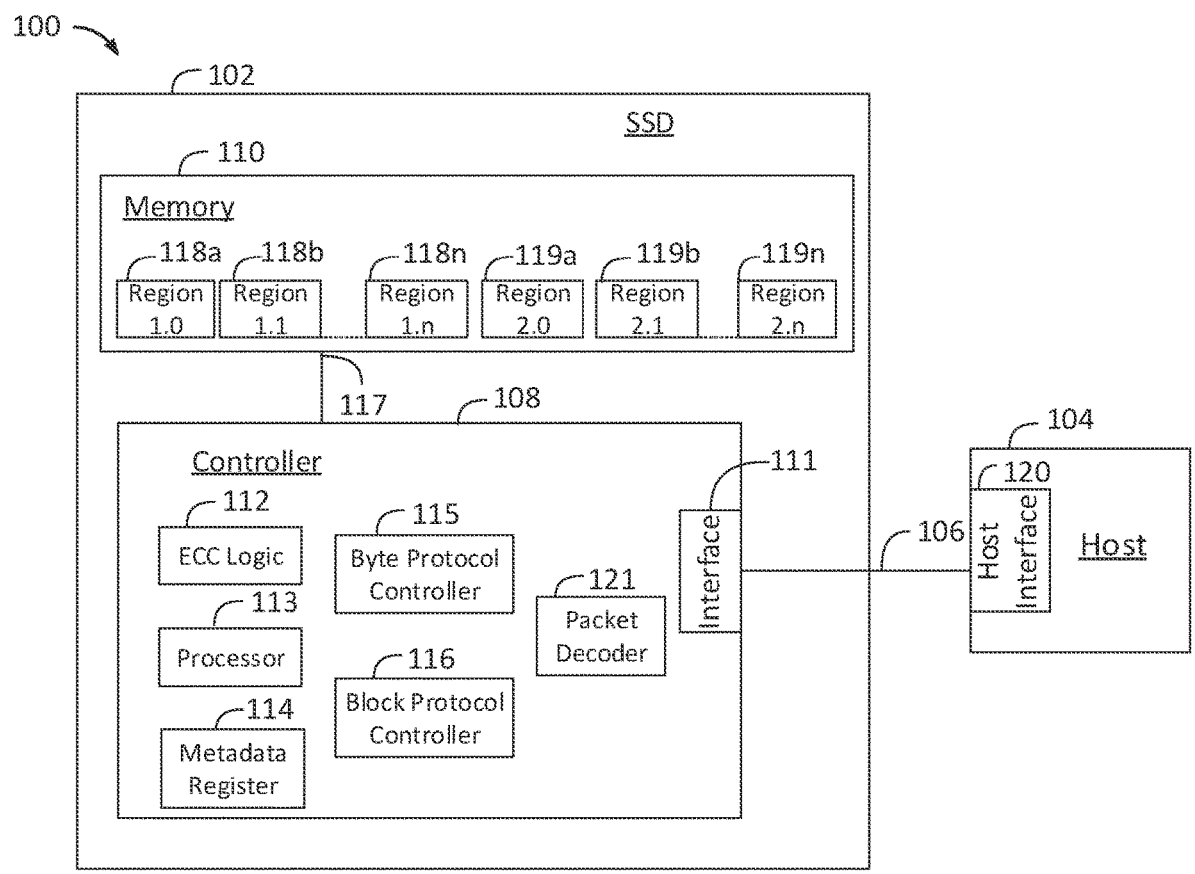
FIG. 1 shows a block diagram of an SSD system having byte addressable NV storage regions and block addressable NV storage regions.

FIG. 1 shows a block diagram of a hybrid SSD system 100 including byte addressable NV storage regions and block addressable NV storage regions. The SSD system supports byte addressable protocol and block addressable protocol, allowing the SSD to process and store data according to both block and byte addressable protocols. The SSD system 100 includes an SSD 102 and host 104 coupled by a bus 106. The SSD 102 includes SSD controller 108 having ECC logic 112, processor 113, metadata register 114, packet decoder 121, and block addressable protocol controller 115 and byte addressable protocol controller 116. The SSD 102 also includes interface 111 and memory 110 including first storage regions 118a-118n and second storage regions 119a-119n. The SSD controller 108 is coupled to the memory by one or more memory channels 117 (only a single channel is shown for clarity). The host 104 includes host interface 120.

The channel or bus 106 couples the host 104 to the SSD 102. The host 104 transmits and receives packets of data at the host interface 120. The packets of data transmitted and received by the host include command packets, as well as data for storage in the SSD 102, sometimes referred to as a command payload.

The SSD controller 108 includes processor 113, which may be a storage pool selection processor. The processor 113 determines whether to classify each storage region of first storage regions 118a-118n and second storage regions 119a-119n as byte addressable or block addressable. The SSD controller 108 receives commands and data packets at the interface 111 and the packet decoder 121 determines the transfer protocol of the received data packet. The packet decoder 121 classifies and routes incoming data packets and may be implemented as shown in the SSD controller 108, or in the interface 111. The packet decoder 121 may be implemented as hardware logic in the SSD controller 108 or the interface 111. After the packet decoder 121 determines the transfer protocol of the received command, the SSD controller 108 and processor 113 process the command by accessing the memory 110 including first storage regions 118a-118n and second storage regions 119a-119n. For example, the SSD controller 108 may receive a command to store byte addressable data in the memory 110. The SSD controller 108 and processor 113 may determine that storage region 118a is a byte addressable NV storage region and may store the data there. Alternatively, the data may be block addressable data and SSD controller 108 and processor 113 may determine that second storage region 119a is block addressable NV storage and store the data in second storage region 119a. The method by which the controller 108 identifies the correct transfer protocol for the received command and processes the command is described further below.

The SSD controller 108 maintains metadata register 114 including a list of byte addressable NV storage regions (byte addressable resource pool) and block addressable NV storage regions (block addressable resource pool) in the SSD 102. Metadata register 114 also includes counts of the number of times that each storage region of first storage regions 118a-118n and second storage regions 119a-119n has been overwritten, read from, written to, erased, and otherwise accessed. The metadata register 114 may also include other data such as storage regions or portions of regions marked for erasure during garbage collection activities or a previous number of errors in a storage region identified by ECC logic 112. ECC logic 112 may be utilized periodically by the SSD controller 108 to provide an indication of the number of errors such as bit-flip errors in each storage region and to attempt to correct identified errors. ECC logic 112 may be able to correct up to a certain number of errors.

If a number of errors in a storage region of first storage regions 118a-118n, which is classified by SSD controller 108 and processor 113 as byte addressable, exceeds the number of errors correctable by the ECC logic 112, the storage region may no longer be used as byte addressable NV storage. Instead, the SSD controller 108 and processor 113 may reclassify the storage region as a block addressable NV storage region. For example, if ECC logic 112 identifies a number of errors in first storage region 118a that exceeds a threshold number of errors, the SSD controller 108 and processor 113 reclassifies the first storage region 118a as block addressable NV storage and updates the classification of the storage region in the metadata register 114. Following reclassification, block addressable data may be stored to first storage region 118a.

Additionally, if a number of reads, writes, erases, or overwrites of a storage region as recorded in the metadata register 114 exceeds a threshold, the SSD controller 108 and processor 113 reclassifies the first storage region 118a as block addressable NV storage and updates the classification of the first storage region 118a in the metadata register 114. Additional reclassification factors and thresholds are discussed below in regard to FIG. 2. The threshold number of reads, writes, erases, or overwrites may be predetermined and set by the manufacturer, or may be set by a user of the SSD system 100. The threshold number of errors may also be predetermined and set by the manufacturer or a user.

The SSD controller 108 may be enabled for use with block addressable and byte addressable NV storage and transfer protocols. For example, in some implementations, the SSD controller 108 is enabled for use with both GEN-Z byte addressable protocols and NVMe Over Fabric block addressable protocols. The SSD controller 108 and host 104 may process both block addressable and byte addressable transfer protocols by encapsulating block addressable commands and command payloads in a byte addressable command packet and decoding identifiers in the packet headers to identify to the SSD controller 108 which protocol is to be used. The packet decoder 121, located either in the SSD controller 108 or the interface 111, may identify and route incoming data packets according to the protocol to be used. In some implementations, vendor-defined operator classes (OpClasses) and operator codes (OpCodes) are used as a unique identifiers to indicate whether the packet will be decoded using Gen-Z byte addressable protocols or NVMe Over Fabric block addressable protocols.

In some implementations, the first storage regions 118a-118n and second storage regions 119a-119n are hybrid storage memories such as storage class memory (SCM). In some implementations, the first storage regions 118a-118n and second storage regions 119a-119n are magnetic random-access memory (MRAM), resistive random access memory (ReRAM) or Phase Change memory (PCM). In some implementations, the SSD 102 may include one or more embedded central processing unit (CPU) cores. The SSD controller 108 may be instantiated as field programmable gate arrays (FPGA), on a printed circuit board (PCB), or as an application-specific integrated circuit (ASIC). For example, an SSD controller 108 instantiated on a configurable PCB may include high endurance SCM controller logic connected with the SCM dies, as well as reconfigurable FPGA-based block storage protocol features and priority based storage application acceleration hardware logics such as replication and ECC and/or the erasure code logic. In some implementations, the SSD controller 108 and/or processor 113 is implemented as firmware. The SSD controller 108 includes the block addressable protocol, such as NVMe Over Fabric protocol encode and decode logic within an ASIC or FPGA. In some implementations, the block addressable protocol, such as NVMe Over Fabric protocol encoding and decoding is completed in the SSD controller 108 in an encode/decode acceleration engine which intercepts or receives the transmitted commands identified as including block addressable protocol. The host 104 also includes embedded CPU resources that enable the host 104 to communicate with the SSD 102 and to encode, decode, and process the block addressable protocol and byte addressable protocol. In some implementations, a Gen-Z switch enables communication between the host 104 and the SSD 102.

In some implementations, the SSD 102 is a member of a storage cluster of multiple SSDs, with direct interface connections to the host 104. The host 104 accesses the block addressable resources or the byte addressable resources on the SSD 102 and other SSDs in the storage cluster based on user application latency priority requirements. For example, an FPGA-based hardware accelerator and CPU firmware in the SSD controller 108 may handle data mirroring replication traffic using byte addressable resources with higher priority and lower latency, but may handle other time consuming operations like erasure code logic traffic with lower priorities in the block addressable NV storage resources. This capability may be configurable from a software API at the host interface 120 of the host 104. In some implementations, the FPGA-based hardware accelerator may be statically configured during manufacturing or during a scheduled upgrade cycle and may not be reconfigured during user application run time.

In some implementations, the bus 106 may formed as a serializer/deserializer (SerDes) link communicatively coupling the interface 111 of the SSD 102 to the host interface 120 of the host 104. The SerDes link or interconnect at the bus 106 coupling the SSD 102 to the host 104 is enabled to transmit packets of data utilizing either byte addressable and block addressable transfer protocols. For example, in some implementations, the SerDes link is enabled to transmit packets of data using Gen-Z byte addressable transfer protocol and packets of data using NVMe Over Fabric block addressable protocol. The SSD controller 108 supports storage of packets of data using byte or block addressable protocols, by allowing byte addressable commands and block addressable NVMe Over Fabric protocols to run on the same high-speed SerDes link. The SSD controller 108 processes both byte addressable commands and block addressable commands running on top of the SerDes link channel by enabling the dynamic reconfiguration of SSD resources, such as the reclassification of one or more of first storage regions 118a-118n from byte addressable to block addressable NV storage regions. The SSD controller 108 extends the life of the SSD 102 by reconfiguring the byte addressable resource pool and block addressable resource pools by reclassifying byte addressable NV storage as block addressable. As will be described further below in FIG. 2, the SSD controller 108 reclassifies byte addressable NV storage as block addressable based on manufacturing test data, in the field based on overwrite counts, number of hard errors or estimate of the longevity/endurance condition of the storage modules, or based on user application resource requirements.

Enabling dynamic reconfiguration of storage resources may decrease the manufacturing cost of SSDs having this capability because storage resources in an SSD can be utilized as block addressable NV storage if they are manufactured with too many faulty memory cells to function as byte addressable NV storage, reducing waste and simplifying the manufacturing process. For example, during the final test stage of multiple storage dies, such as SCM dies, if a particular die is classified as high quality and high endurance the SSD controller 108 classifies and uses the die as a byte addressable NV storage resource. If instead, a particular die is classified as having a lower quality with a larger number of memory errors than can be recovered using ECC logic 112, the SSD controller 108 classifies and uses the die as a block addressable NV storage resource. The SSD controller 108 may record the classification in metadata register 114, in another register or within firmware of the SSD controller 108. Using the die's endurance rating and manufacturing quality during the final manufacturing test stages in classification of the die as part of the byte addressable or block addressable resource pool makes use of all available resources while reducing manufacturing cost.

During the operating life of the SSD 102 byte addressable NV storage regions which can no longer function as byte addressable NV storage can be reclassified by the SSD controller 108 as block addressable NV storage. For example, if a particular storage region or die is running out of endurance cycles or is exhibiting too many memory errors to be utilized as byte addressable NV storage, but is still correctable with a stronger ECC as a block storage region, it can be reclassified as block addressable NV storage. The SSD controller 108 can remove the die in question from the byte addressable resource pool in the metadata register 114, but can reuse the same die in the block addressable resource pool. Finally, user applications running on the host 104 can dynamically reconfigure the byte addressable resource pool and block addressable resource pool according to the requirements of the user applications. For example, a user application may require a larger allocation of fast, low latency short term storage than slower, longer term storage, in which case the SSD controller can allocate more storage regions classified as byte addressable NV storage than storage regions classified as block addressable NV storage for that application.

Figure 2:
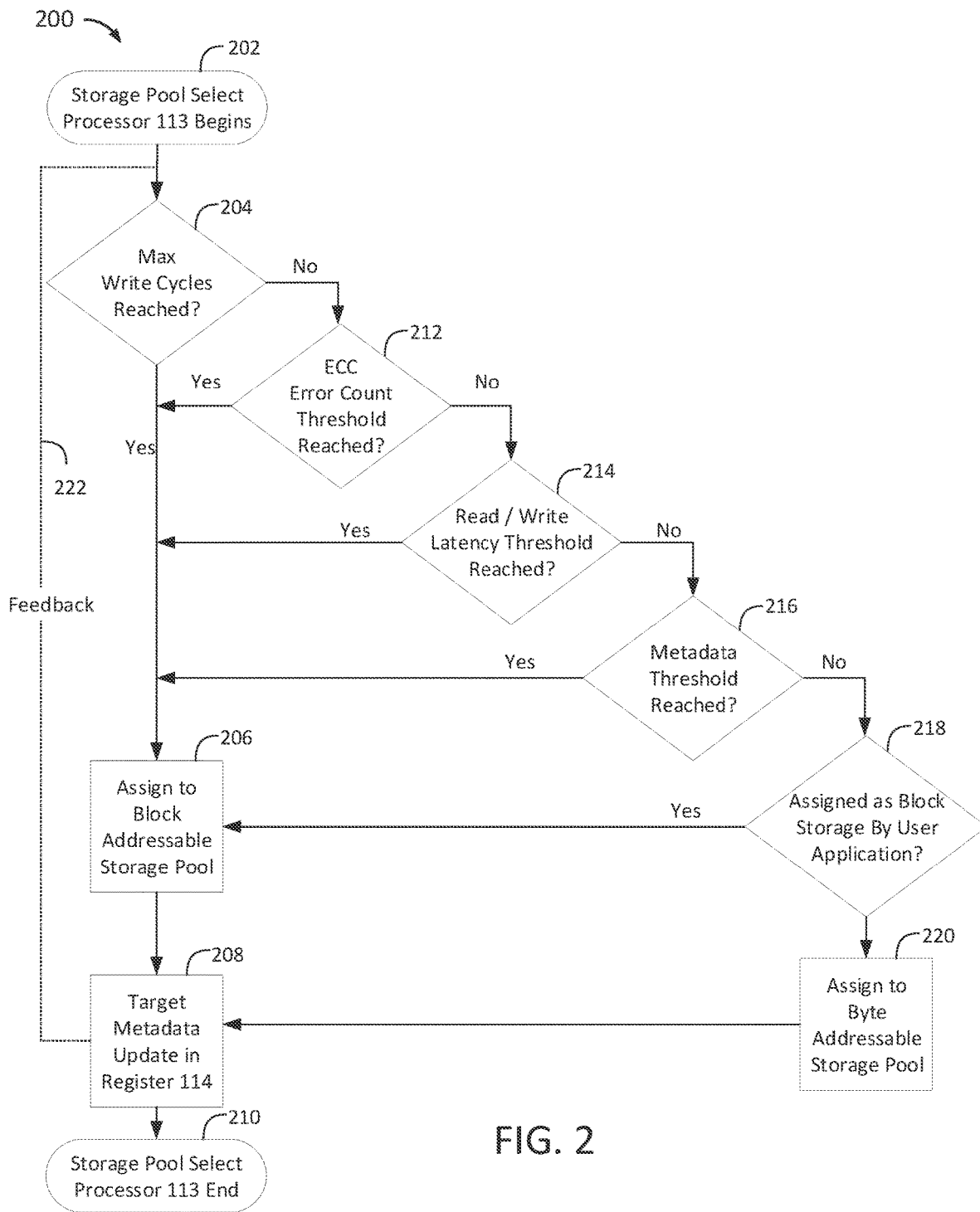
FIG. 2 shows a decision method for determining whether a byte addressable NV storage region will be reclassified as a block addressable NV storage region.

The method by which the SSD controller 108 determines whether to reconfigure or reclassify a byte addressable NV storage region as block addressable is further described in FIG. 2. FIG. 2 shows a decision method 200 for determining whether a byte addressable NV storage region will be reclassified as a block addressable NV storage region.

At step 202 the method begins when a storage pool selection processor 113 within the SSD controller 108 begins to function with respect to a particular byte addressable SSD die or region (for example, one of first storage regions 118a-118n or one of second storage regions 119a-119n of FIG. 1). At step 204 it is determined if the maximum number of write cycles has been reached for the particular region, for example storage region 118a. The number of write cycles for the region are recorded in a register (for example, metadata register 114 of FIG. 1). The number of write cycles for the particular storage region 118a may be accessed and compared to a maximum number of write cycles, which may be a threshold set by the manufacturer or by the user or user application. If the maximum number of write cycles has been reached for the particular SSD storage region 118a, the region 118a is assigned to the block addressable NV storage pool at step 206. At step 208, the target metadata is updated, for example in a register 114, to indicate that the region 118a is to be classified as a block addressable NV storage region. The method ends at step 210 when the storage pool selection processor 113 ends.

If instead at step 204, the maximum number of write cycles has not been reached, the method continues to step 212. At step 212, it is determined if the ECC error count threshold has been reached. The number of ECC error count for the particular region may be stored in a register 114, or may be calculated or tabulated by ECC logic (for example ECC logic 112 in FIG. 1) or other housekeeping logic in the controller (for example SSD controller 108 in FIG. 1). In some implementations, different byte addressable NV storage regions may have difference assigned ECC error count thresholds. The ECC error count threshold may indicate a number of errors which are not correctable by ECC for byte addressable NV storage, and may be predetermined and set by the manufacturer or by a user or user application. While the ECC error threshold may indicate the point at which byte addressable NV storage cannot be corrected by ECC logic 112, in many block storage applications, errors are correctable with stronger ECC firmware or hardware logic because many more bits are consumed by block storage application I/O compared to byte addressable protocols. The increased latency caused by using stronger ECC logic may be acceptable in block storage applications because the storage applications have relatively small amounts of frequently accessed "hot" data and much larger amounts of "cold" or "warm" data which is infrequently accessed. If the ECC error count threshold is met, the method proceeds through steps 206, 208, and 210 to reclassify the region 118a as a block addressable NV storage resource.

If the ECC error count threshold is not met, the method instead continues to step 214. At step 214, the controller 108 determines if the read/write latency threshold is reached for the storage region 118a. The read/write latency of the storage region may be measured by the controller. The read/write latency threshold may be predetermined and set by the manufacturer or by a user or user application. If the read/write latency threshold is determined to have been reached for the storage region, the method proceeds through steps 206, 208, and 210 to reclassify the region 118a as a block addressable NV storage resource.

If the read/write latency threshold is not met, the method continues to step 216 where the controller 108 determines if the metadata threshold has been reached for the storage region 118a. The metadata threshold may be predetermined and set by the manufacturer or by a user or user application. If the metadata threshold has been reached for the storage region 118a, the method proceeds through steps 206, 208, and 210 to reclassify the region 118a as a block addressable NV storage resource. If the metadata threshold has not been reached for the storage region 118a, the method continues to step 218.

At step 218, the controller 108 determines whether the storage region 118a has been assigned as block storage by the user application. Some user applications may need to make use of block addressable NV storage, and the user application on the host may communicate this need to the SSD 102 by assigning a storage region or die to be block addressable NV storage. If the user application has assigned the storage region 118a to be block storage, the method continues through steps 206, 208, and 210 to reconfigure or reclassify the region 118a as block addressable NV storage. If the user application has not assigned the storage region 118a to be block addressable, then at step 220 the controller assigns the storage region 118a to the byte addressable NV storage resource pool. The controller then updates the target metadata in a register 114 accordingly at step 208 and ends at step 210. The updated target metadata from step 208 may be provided as feedback into the method such that when the method 200 next runs, the current assignment of the storage region 118a is known.

By determining by a variety of measures whether the storage region 118a or module is degraded, and reconfiguring the region 118a as a block addressable resource if the region 118a is degraded, the SSD controller 108 extends the life of the SSD 102 and optimizes the resource use on the SSD 102. In most user environments, byte addressable NV storage will degrade with time and the number of overwrite cycle such that portions of the storage module will not be functional as byte addressable NV storage after certain use or lifetime thresholds are met. By reclassifying the storage as block addressable once these thresholds are met according to the method in FIG. 2, the availability of storage on the SSD 102 is extended even if available byte addressable NV storage is decreased.

Figure 3:
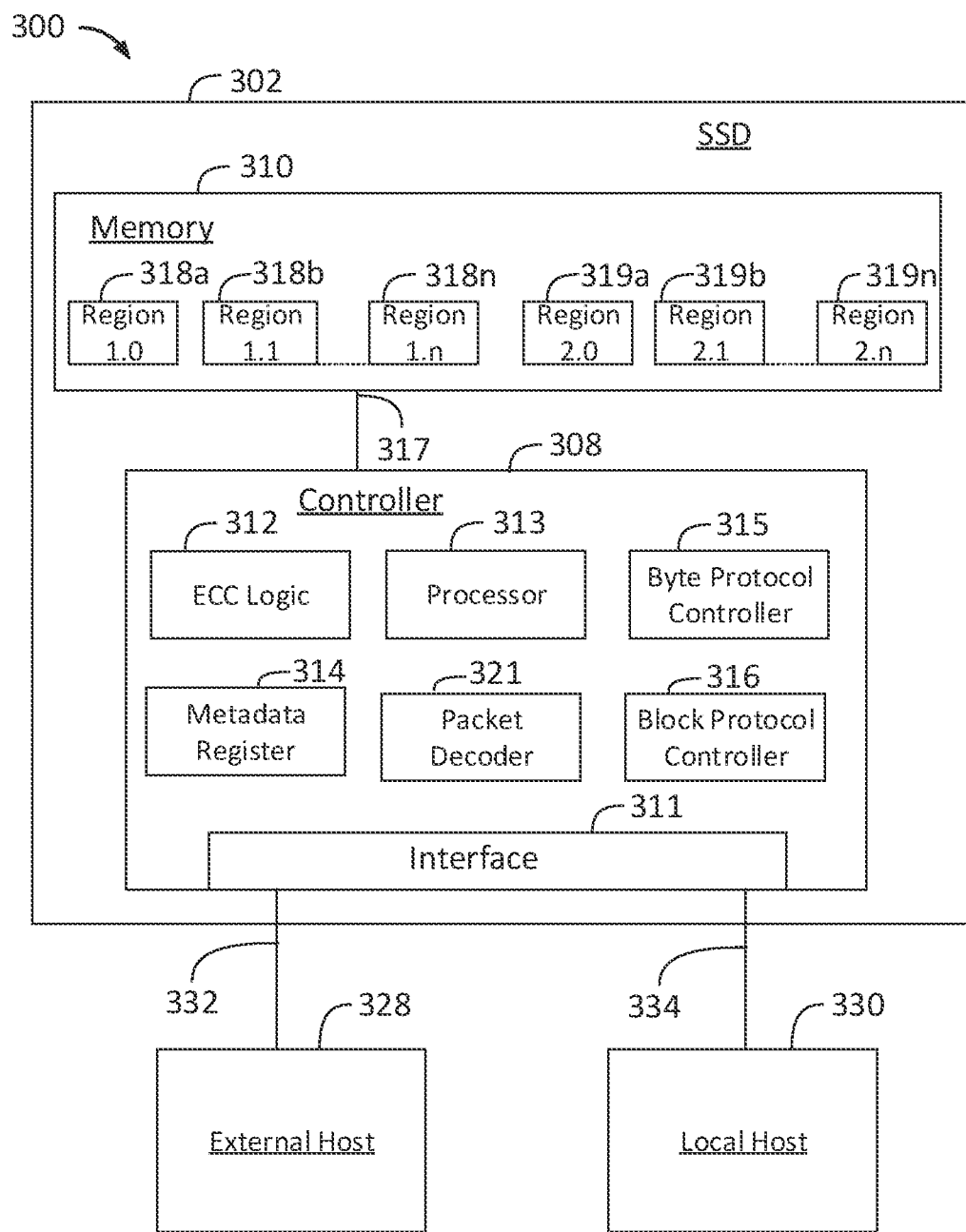
FIG. 3 shows a block diagram of an SSD system including external and local hosts.

FIG. 3 shows a block diagram of an SSD system 300 including external and local hosts for long distance communication of data or duplication of data on additional servers. The SSD 302 in FIG. 3 is largely the same as illustrated in FIG. 1 and includes an SSD controller 308 having ECC logic 312, processor, such as a storage pool selection processor, 313, metadata register 314, packet decoder 321, and block addressable protocol controller 315 and byte addressable protocol controller 316. The SSD 302 also includes interface 311 and memory 310 including first storage regions 318a-318n and second storage regions 319a-319n. The SSD controller 308 is coupled to the memory by one or more memory channels 317. The SSD system 300 supports byte addressable protocol and block addressable protocol, allowing the SSD 302 to process and store data according to both block and byte addressable protocols, and, as described above, the SSD system 300 includes reconfigurable first storage regions 318a-318n and second storage regions 319a-319n. The packet decoder 321, located either in the SSD controller 308 as shown, or in the interface 311, may identify and route incoming data packets according to whether block addressable or byte addressable protocol is to be used to carry out the command or store the command payload. The SSD controller 308 includes processor 313 which is capable of reassigning or reconfiguring the first storage regions 318a-318n and second storage regions 319a-319n from byte addressable NV storage into the block addressable NV storage pool based on wear or degradation characteristics, manufacturing defects, or user application requirements.

Whereas SSD 102 in FIG. 1 was shown as coupled to a single local host 104, here SSD 302 is coupled to local host 330 by first channel 334 and to external host 328 by second channel 332. An SSD 302 coupled to an external host 328 may be used for long distance communication of data or for saving duplicate data to an external server for later recovery. While not shown in FIG. 3 for clarity, local host 330 and external host 328 may include host interfaces. As described with respect to FIG. 3, first channel 334 communicatively coupling local host 330 and SSD 302 be may formed as a high-speed SerDes link running both byte addressable commands and block addressable commands. External host 328 may also be coupled to the SSD 302 by a SerDes link, such as an Ethernet link running NVMe/TCP protocol, which enables the SSD controller 308 to support legacy Ethernet based data center environments. The configurable block and byte addressable NV storage SSD 302, with byte addressable commands and block addressable commands running over the SerDes link and the Ethernet link allows for enhanced ability for remote or duplicative storage and effective communication with multi-data disaster recovery center environments. In another embodiment, the local host 330 and external host 328 may be connected to SSD 302 via a high-speed networking fabric (not shown for clarity) employing networking switches and routers.

Typical Ethernet connections supporting NVMe Over Fabric block storage solutions, do not include an integrated Ethernet connection with the SSD. Instead, the local host would facilitate the exchange of NVMe Over Fabric protocol, introducing latency. However, the SSD 302 capable of processing block addressable protocols and byte addressable protocols may include an integrated Ethernet SerDes link 332 within the hybrid SSD 302.

The SSD 302 may be a cluster member of a storage cluster of other SSDs having direct connection to the local host 330 by other SerDes links such as by Ethernet to support existing legacy multi-site data center disaster recovery requirements. For example, a user application may configure the byte-addressable resource pool with higher priority for a high performance low latency burst buffer application within a data center. The user application may also use the block storage resource pool including storage regions classified as block storage for storage of a zero memory copy RDMA operation at another data center via the external SERDES link 332 (such as Ethernet) running NVMe Over Fabric on transmission control protocol (NVMe/TCP).

Figure 4:
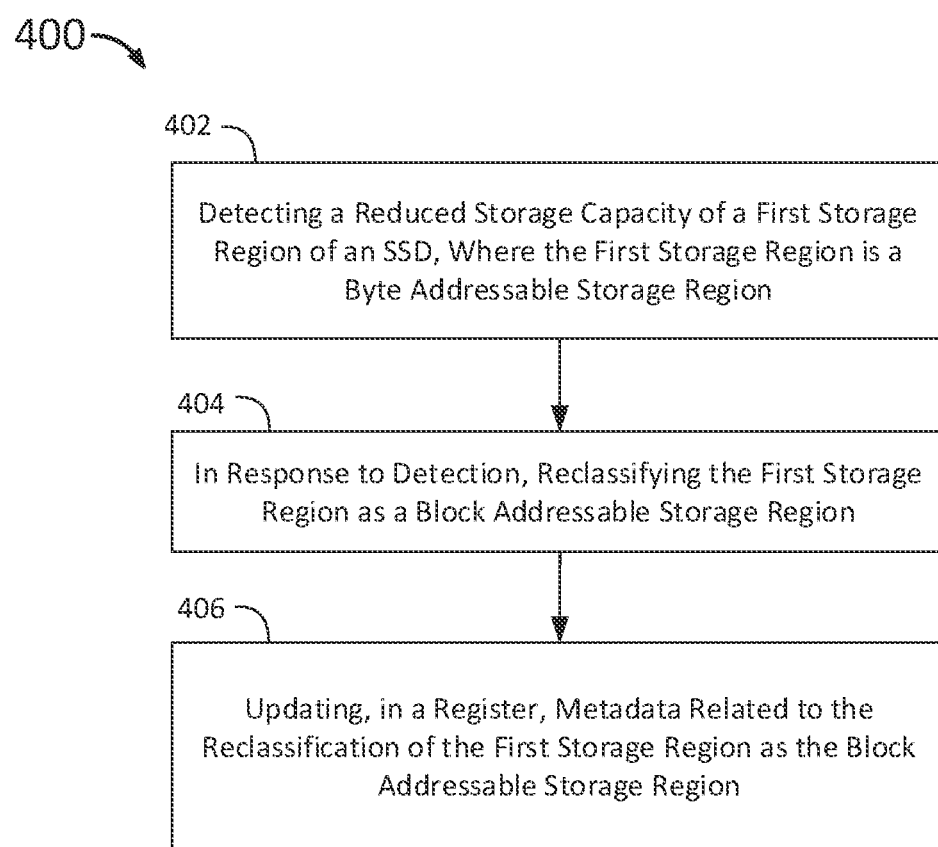
FIG. 4 shows a flow diagram for a method for reclassifying a byte addressable NV storage region as a block addressable NV storage region.

FIG. 4 shows a flow diagram for a method 400 for reclassifying a byte addressable NV storage region as a block addressable NV storage region. At step 402, a controller (for example, SSD controller 108 in FIG. 1, SSD controller 308 in FIG. 3) in an SSD (for example, SSD 102 in FIG. 1, SSD 302 in FIG. 3) detects a reduced storage capacity of a first storage region (for example, first storage region 118a in FIG. 1, first storage region 318a in FIG. 3) of the SSD. As described above, in regard to FIGS. 1 and 2, the controller 108 may include processor 113 which acts as a storage pool selection processor. The first storage region 118a is originally configured as a byte addressable NV storage region. The classification of the first storage region 118A may be recorded in a register (for example, metadata register 114 in FIG. 1, metadata register 314 in FIG. 3) within the controller 108. The SSD 102 includes multiple storage regions (for example, first storage regions 118a-118n or second storage regions 119a-119n of FIG. 1, first storage regions 318a-318n or second storage regions 319a-319n in FIG. 3) which are accessible by one or more hosts (for example host 104 in FIG. 1, local host 330 or external host 328 in FIG. 3) for the storage of data. As described above in regard to FIG. 2, and as will be further described below, the reduced storage capacity may be determined based on a variety of factors, such as a write count to the storage region, a number of errors in the storage region, a reclassification of the storage region by a user application, or other factors.

At step 404, in response to the detection of reduced storage capacity, the controller 108 reclassifies the first storage region 118a as a block addressable NV storage region. At step 406, the controller updates the register 114 with the metadata associated with the reclassification of the first storage region 118a as a block addressable NV storage region. The first storage region 118a is then accessible for block storage only. By reconfiguring the storage region as block addressable NV storage when it has become unsuitable for use as a byte addressable NV storage region, the life of the storage region 118a and SSD 102 are extended as compared to conventional SSDs for which storage regions that cannot be used as byte addressable NV storage are simply unavailable for storage of any kind.

The SSD controller 108 may prioritize the types of data from the host 104 to be stored in remaining byte addressable NV storage and in the block addressable NV storage depending on the purpose of the data. For example, data which requires low latency and fast processing may be stored in byte addressable regions, while high-latency tolerant or infrequently accessed data may be stored in the block storage regions. For example, data being copied for archiving or other "cold" data may be stored in the block addressable NV storage regions of the SSD.

Figure 5:
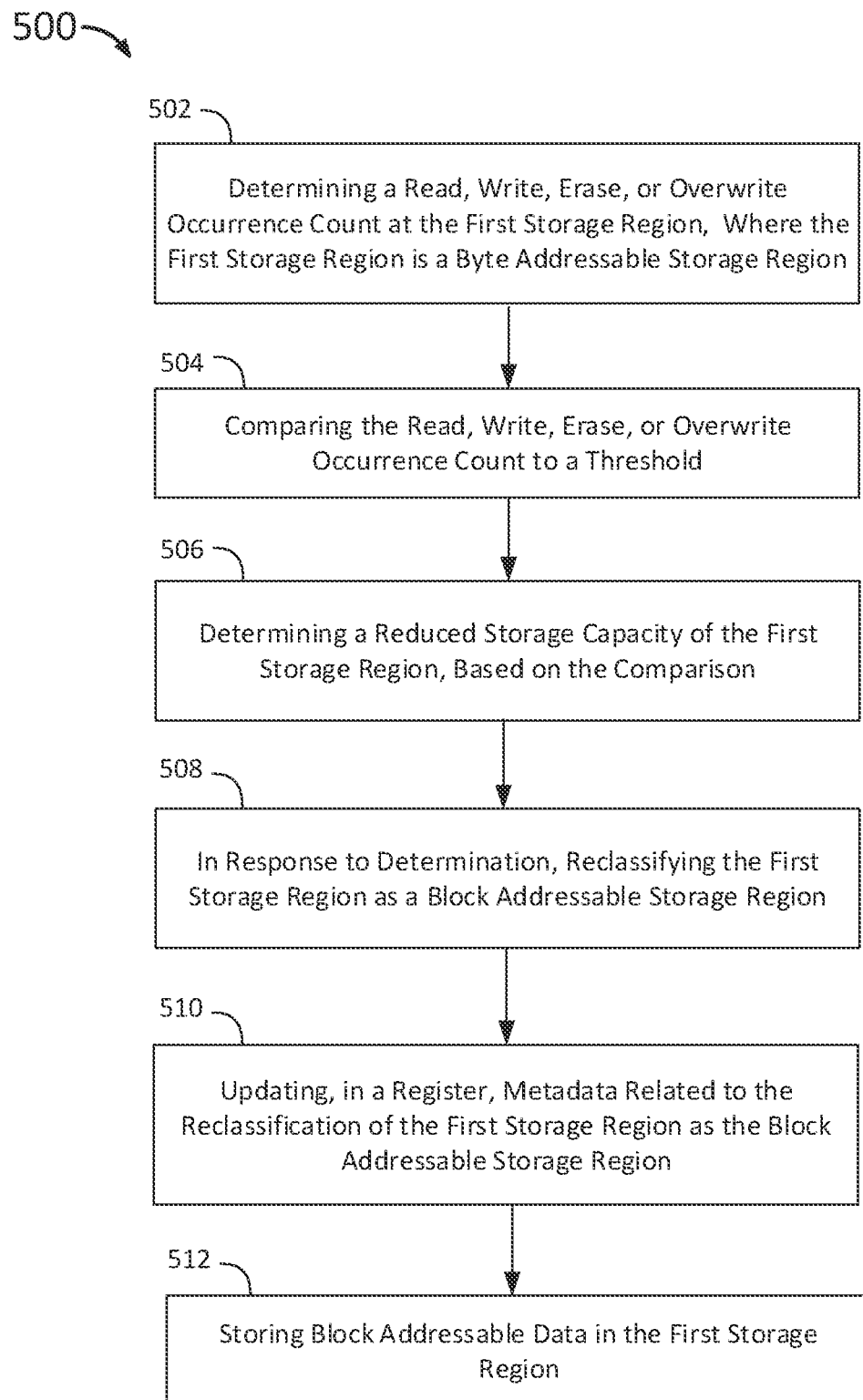
FIG. 5 shows a flow diagram for a method for reclassifying a byte addressable NV storage region as a block addressable NV storage region based on overwrite occurrence.

FIG. 5 shows a flow diagram for a method 500 for reclassifying a byte addressable NV storage region as a block addressable NV storage region based on read, write, erase or overwrite occurrence. Some types of storage, such as SCM, may be prone to read disturb errors, while others may have or require an erase cycle with separate write or program cycles. At step 502, a controller (for example, SSD controller 108 in FIG. 1, SSD controller 308 in FIG. 3) in an SSD (for example, SSD 102 in FIG. 1, SSD 302 in FIG. 3) detects a read, write, erase or overwrite occurrence count at the first storage region (for example, first storage region 118a in FIG. 1, first storage region 318a in FIG. 3) of the SSD. The first storage region 118a is originally configured as a byte addressable NV storage region. The classification of the first storage region 118a may be recorded in a register (for example, metadata register 114 in FIG. 1, metadata register 314 in FIG. 3) within the controller 108. The SSD 102 includes multiple storage regions (for example, first storage regions 118a-118n or second storage regions 119a-119n of FIG. 1, or first storage regions 318a-318n or second storage regions 319a-319n in FIG. 3) which are accessible by one or more hosts 104 for the storage of data.

The occurrence of reads, writes, erases or overwrites may be stored in the register 114 and accessed by the controller 108 periodically or at the occurrence of a further read/write/erase/overwrite event to the first storage region 118a. In some implementations, other event counts indicative of a number of times the first storage region 118a has been accessed may be recorded and used for reclassification purposes as well.

At step 504, the controller 108 compares the overwrite occurrence count to a threshold. The threshold may be a predetermined threshold number set by the manufacturer, or may be a threshold set by a user or user application. The threshold may be dynamically configured and may be based on a total number of times the SSD 102 has been accessed by the host 104.

At step 506, the controller 108 determines a reduced storage capacity of the first storage region 118a of the SSD 102 based on the comparison to the threshold. In some implementations, if the threshold is met the controller 108 determines the storage capacity has been reduced and reclassification is required. In some implementations, if the threshold is exceeded the controller 108 determines that reclassification is required. At step 508, the controller 108 reclassifies the first storage region 118a as a block addressable NV storage region in response to the determination of step 506. At step 510, the controller 108 updates the metadata related to the reclassification of the first storage region 118a as the block addressable NV storage region in a register 114. At step 512, the controller 108 then stores block addressable data in the first storage region 118a.

Figure 6:
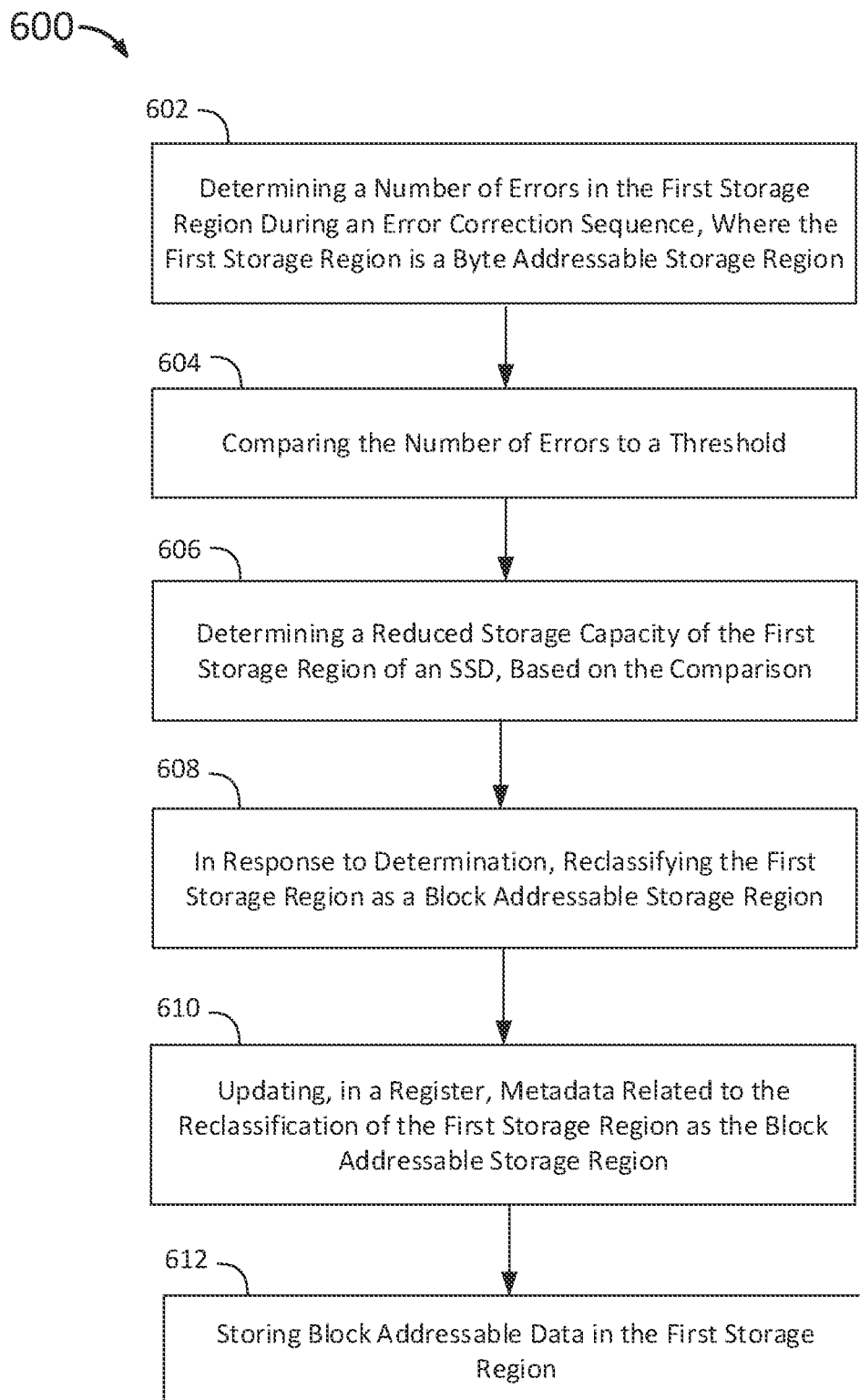
FIG. 6 shows a flow diagram for a method for reclassifying a byte addressable NV storage region as a block addressable NV storage region based on a number of errors in the storage region.

Other indicators may be used by the controller to determine if reclassification of the storage region is required. For example, FIG. 6 shows a flow diagram for a method 600 for reclassifying a byte addressable NV storage region as a block addressable NV storage region based on a number of errors in the storage region. Errors may be encountered during read, write, erase, overwrite or other types of access cycles of the memory modules comprising the byte addressable NV storage region. At step 602, a controller (for example, SSD controller 108 in FIG. 1, SSD controller 308 in FIG. 3) in an SSD (for example, SSD 102 in FIG. 1, SSD 302 in FIG. 3) detects a number of errors in the first storage region (for example, first storage region 118*a* in FIG. 1, first storage region 318*a* in FIG. 3) of the SSD 102. The first storage region (for example storage region 118*a*) is originally configured as a byte addressable NV storage region. The classification of the first storage region 118*s* may be recorded in a register (for example, metadata register 114 in FIG. 1, metadata register 314 in FIG. 3) within the controller 108. The SSD 102 includes multiple storage regions (for example, first storage regions 118*a*-118*n* or second storage regions 119*a*-119*n* of FIG. 1, or first storage regions 318*a*-318*n* or second storage regions 319*a*-319*n* in FIG. 3) that are accessible by one or more hosts (for example host 104 in FIG. 1, local host 330 or external host 328 in FIG. 3) for the storage of data. The number of errors in the storage region 118*a* may be recorded and accessed in a register 114 of the controller 108, or may be counted during a garbage collection or other routine maintenance of the SSD 102. The number of errors in the storage region 118*a* may be the number of bit flips or bits stuck at 0 or 1 detected by the ECC logic 114. In some implementations, the number of errors in the storage region 118*a* may be determined periodically or in response to an event at the storage region 118*a*, such as a request to access the storage region 118*a*.

At step 604, the controller 108 compares the number of errors in the first storage region 118*a* to a threshold. The threshold may be a predetermined threshold set by the manufacturer and dependent on the ECC logic 114 available in the SSD 102. The threshold may be a number of errors in a storage region 118*a* above or at which the ECC logic 114 is unable to correct the errors without introducing unacceptable latency to the system. In some implementations, the threshold is set by a user or user application. At step 606, the controller 108 determines a reduced storage capacity of the first storage region 118*a* of the SSD 102 as a byte addressable NV storage region based on the comparison. In some implementations, if the number of errors in the storage region 118*a* meets the threshold, the controller 108 determines a reduced storage capacity. In some implementations, if the number of errors in the storage region 118*a* exceeds the threshold, the controller 108 determines a reduced storage capacity.

At step 608, in response to the determination of a reduced storage capacity of step 606, the controller 108 reclassifies the first storage region 118*a* as a block addressable NV storage region. At step 610, the controller 108 updates the metadata related to the reclassification of the first storage region 118*a* as the block addressable NV storage region in a register 114 in the SSD 102. In step 612, the controller 108 stores block addressable data in the first storage region 118*a*.

Enabling dynamic reconfiguration of storage region protocols over the lifetime of the SSD 102 increases longevity of the SSD 102 because byte addressable NV storage regions which would typically be unavailable due to degradation are made available as block addressable high-endurance storage regions. As described above, the reclassification or reconfiguration of available storage regions on an SSD 102 may occur during or after manufacturing, dynamically during the operating life of the SSD 102 as a response to degradation or based on the requirements of a user application resource. Reallocation of the storage regions over the course of the SSDs operational life allows the SSD 102 controller to determine whether to classify the storage region 118*a* as byte storage or block storage based on a variety of factors related to the use and availability of the storage region extending the lifetime and availability of storage.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A solid state drive (SSD) enabled to dynamically change byte addressable storage regions to block addressable storage regions, the SSD comprising:
   a first storage region classified as a byte addressable storage region;
   a controller communicatively coupled to the first storage region by a bus, the controller configured to:
      determine a number of data errors in the first storage region that exceed a threshold; and
      in response to the determination, reclassify the first storage region as a block addressable storage region.

2. The SSD of claim 1, wherein the threshold is a maximum number of data errors correctable by an ECC logic of the controller.

3. The SSD of claim 2, wherein the threshold is predetermined for the first storage region.

4. The SSD of claim 2, wherein the controller is further configured to:
   initiate an error correction sequence;
   determine the number of data errors in the first storage region; and
   compare the number of data errors in the first storage region to the threshold.

5. The SSD of claim 2, wherein the ECC logic periodically provides to the controller an indication of the number of data errors in the first storage region, and the controller stores the indication of the number of data errors in a register of the controller.

6. The SSD of claim 5, wherein the controller is further configured to:
   access the number of data errors in the register for comparison to the threshold.

7. The SSD of claim 1, further comprising:
   after reclassifying the first storage region as a block addressable storage region, initiating a block storage region error correction sequence.

8. The SSD of claim 1, wherein the controller is further configured to update, in a register of the controller, metadata related to the reclassification of the first storage region as the block addressable storage region.

9. The SSD of claim 1, further comprising:
   a second storage region classified as a byte addressable storage region.

10. The SSD of claim 9, wherein the controller is further configured to:
    store byte addressable data in the first storage region in the second storage region before reclassifying the first storage region as the block addressable storage region.

11. The SSD of claim 10, wherein before reclassifying the first storage region as the block addressable NV storage region, the controller is further configured to:
    receive first byte addressable data from a host; and
    store the first byte addressable data in the first storage region.

12. The SSD of claim 11, wherein after reclassifying the first storage region as the block addressable storage region, the controller is further configured to:
receive first block addressable data from the host; and
store the first block addressable data in the first storage region.

13. A method for extending the life of a solid state drive (SSD) including a first storage region and a controller communicatively coupled to the first storage region, the method including:
determining, by the controller, a number of data errors in the first storage region that exceed a threshold; and
in response to the determination, reclassifying, by the controller, the first storage region as a block addressable storage region.

14. The method of claim 13, wherein determining the number of data errors in the first storage region that exceed a threshold further comprises:
initiating an error correction sequence;
determining the number of data errors in the first storage region; and
comparing the number of data errors in the first storage region to the threshold.

15. The method of claim 14, wherein the comparing the number of data errors in the first storage region to the threshold further comprises comparing the number of data errors in the first storage region to a number of errors correctable by an ECC logic of the controller.

16. The method of claim 15, wherein the comparing the number of data errors in the first storage region to a number of errors correctable by an ECC logic of the controller further comprises comparing the number of data errors in the first storage region to a predetermined number of data errors detectable by the ECC logic of the controller.

17. The method of claim 13, the method further comprising:
periodically providing, by the ECC logic to the controller, an indication of the number of data errors in the first storage region; and
storing, by the controller, the indication of the number of data errors in the first storage region in a register of the controller.

18. The method of claim 13, the method further comprising:
updating, in a register of the controller, metadata related to the reclassification of the first storage region as the block addressable storage region.

19. The method of claim 13, the method further comprising:
storing byte addressable data in the first storage region in a second storage region of the SSD before reclassifying the first storage region as the block addressable storage region.

20. The method of claim 19, the method further comprising:
before reclassifying the first storage region as the block addressable storage region:
receiving first byte addressable data from a host; and
storing the first byte addressable data in the first storage region; and
after reclassifying the first storage region as the block addressable storage region:
receiving first block addressable data from the host; and
storing the first block addressable data in the first storage region.

* * * * *